July 8, 1941.  H. B. McLAUGHLIN  2,248,637
COOLING SYSTEM FOR DRAFT BEVERAGES
Filed Dec. 29, 1939  2 Sheets-Sheet 1

INVENTOR:
Howard B. McLaughlin
BY
Ray S. Geher
ATTORNEY.

July 8, 1941.                H. B. McLAUGHLIN                2,248,637
COOLING SYSTEM FOR DRAFT BEVERAGES
Filed Dec. 29, 1939                    2 Sheets-Sheet 2

INVENTOR:
Howard B. McLaughlin
BY Ray A. Gehr
ATTORNEY.

Patented July 8, 1941

2,248,637

UNITED STATES PATENT OFFICE 2,248,637

COOLING SYSTEM FOR DRAFT BEVERAGES

Howard B. McLaughlin, Detroit, Mich., assignor to Temprite Products Corporation, Detroit, Mich., a corporation of Michigan Application December 29, 1939, Serial No. 311,457

8 Claims. (Cl. 62—7)

The invention relates to cooling systems for draft beverages. While applicable to various beverages, the invention is especially useful in connection with draft beer and will be explained as so applied.

Draft beer is dispensed from kegs or barrels in which it is delivered by the brewer to the retailer. In one of the dispensing systems commonly employed by the retailer, the kegs of beer are held in a pre-cooler room having suitable heat-insulated walls and maintained (by mechanical refrigeration or ice) at a suitable temperature to keep the beer in a wholesome condition, a temperature of from 40° F. to 50° F. being suitable for this purpose. Often the pre-cooler is in a basement or cellar while the tap room is on the floor above and the beer lines or pipes from the pre-cooler to the bar or dispensing station may be of considerable length. Consequently the beer, when not being drawn, warms up more or less in the pipes. The beer lines may be covered with insulation material, but even so more or less heat penetrates to the pipes and the beer therein, especially when the pipes have to pass through kitchens, boiler rooms or other heated spaces to reach the bar. Such installations usually include a beer cooler arranged in the bar structure near the draft faucet and such cooler brings the beer to a suitable dispensing temperature, usually 40° F. to 45° F. However, when the beer has warmed up in the beer lines it suffers deterioration which cannot be overcome by merely re-cooling it. As the beer warms up in the line between the pre-cooler and the cooler in the bar, $CO_2$ gas escapes from solution and forms free gas in the line. When beer is next drawn, the undissolved gas passes through the cooler and, although the temperature of the beer may be properly reduced in the cooler, the gas does not go back into solution but appears as foam in the glass. Until the beer line has been cleared of the undissolved gas, the control of foam is lost. It requires but a small amount of free gas in the beer line to spoil several glasses of beer both because of the undue amount of foam and because the loss of gas from solution unfavorably affects the flavor of the beer.

An object of the present invention is to provide a beverage dispensing system of the type in question with cooling means for the beverage line that is structurally simple, functionally efficient and economical both to install and to operate and which is automatic in operation.

A further object of the invention is to provide automatic and economical cooling means for beverage dispensing apparatus which is applicable to any part or all of the beverage line between the source of beverage supply and the point of draft.

For purposes of explanation the invention will now be described with reference to a preferred embodiment as shown in the accompanying drawings but it should be understood that the invention consists in the novel combinations of parts and devices and can be embodied in various specific forms within the scope of the appended claims.

Figures 1, 2:
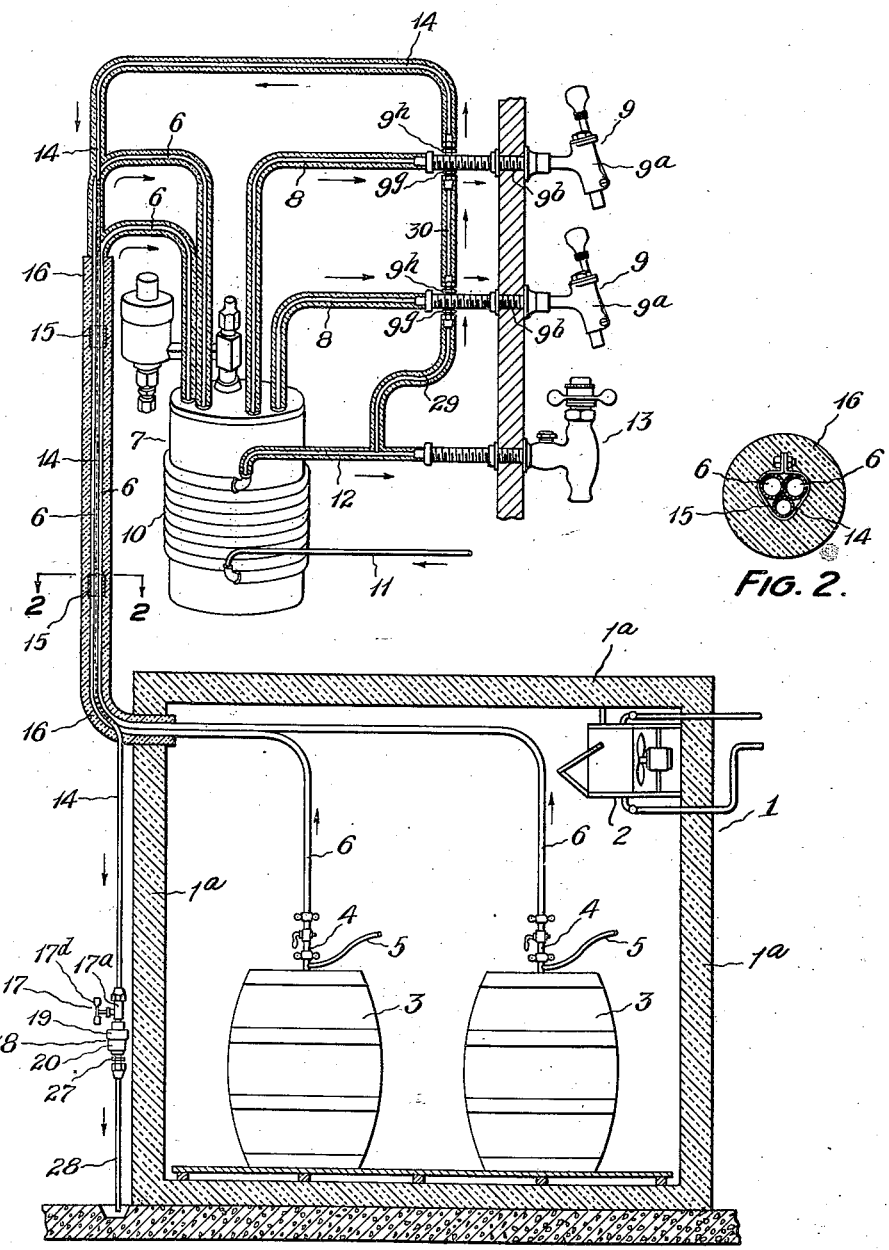
Fig. 1 is a view, more or less diagrammatic, of parts of a beer dispensing and cooling system embodying the invention.
Fig. 2 is a section on the line 2—2 of Fig. 1.

As shown in Fig. 1, the numeral 1 designates as an entirety a pre-cooler room having heat-insulating walls 1a, 1a so that the interior of the pre-cooler can be effectively kept at suitable temperature, say 45° F. to 50° F. by any suitable cooling apparatus, such as the forced convection cooling unit indicated at 2. Within the pre-cooler are kegs or barrels of beer 3 fitted with the usual draft tubes 4, 4 having branch tubes 5 through which the interior of the keg can be connected with a suitable source of compressed $CO_2$ gas or air. Connected to the draft tubes 4 are beer lines 6, 6 extending from the kegs through the wall of the pre-cooler and thence to a beer cooler designated as an entirety by the numeral 7 and which is usually arranged within the bar of the tap room.

The cooler 7 indicated in the drawings is of the instantaneous mechanically cooled type in which the shell of the cooler encloses cooling coils immersed in liquid refrigerant. As any type of cooler can be employed, so far as the present invention is concerned, the cooler 7 need not be described in detail but United States Patent No. 1,985,785 can be referred to for a disclosure of the instantaneous type of liquid cooler. With such cooler each of the beer lines 6, 6 is connected to the inlet end of one of the cooling coils of the cooling unit and the outlet end of each coil is connected to a draft pipe 8 leading to a draft faucet 9. The cooler 7 is shown equipped with a water cooling coil 10 wound upon and in heat-transmitting engagement with the metallic shell of the cooler. The inlet end of coil 10 is connected to a water supply line 11 and the outlet end of said coil is connected with a pipe 12 leading to water faucet 13.

Paralleling the beer lines 6, 6 is a water line 14 which is clamped in heat-transmitting contact with the beer lines by means of clamps 15 or the like. The multiple line thus formed is covered with suitable heat-insulation material 16 as indicated. The water line 14 leaves the heat-insulated beer lines just outside the pre-cooler, as shown, and extends downward to flow-controlling valve devices comprising a manual valve 17 which is connected to the end of pipe 14, and a thermostatic valve 18 which has its inlet connected to the discharge of valve 17 and its own discharge leading to waste.

The hand valve 17 may be of any suitable construction adapted for manual regulation of the flow of the water. As shown, said valve comprises a body 17a formed with valve seat 17b which is adapted to be closed off by valve 17c actuated by handle 17d.

The thermostatic valve 18 has a body or casing structure comprising an inlet section 19 and a discharge section 20 which are threaded together. Inlet section 19 is formed with valve seat 19a which is controlled by valve 21 arranged to close in the direction of flow and actuated by thermostatic devices indicated as an entirety by the numeral 22. The thermostatic devices comprise a cup-shaped shell member 23 formed with an apertured flange 23a which is clamped between the casing members 19 and 20 and an annual shell member 23b which partially closes the upper end of the cup-shaped member 23, the joint between parts 23 and 23b being hermetically tight. Within the shell structure 23, 23b is a tubular bellows diaphragm 24 hermetically joined at one end to shell member 23b and at its other end to a diaphragm disk 25. The chamber between the diaphragm structure 24, 25 and the shell 23, 23b is charged with some suitable volatile fluid, such for example as butane. The member 23 has a central filling aperture 23c which is conveniently sealed (after the charging) with a ball and solder as shown. To the upper side of the diaphragm disk 25 is secured an axial stud or valve carrier 26 which has a rather nice sliding fit through the axial aperture of the shell member 23b and which is formed with a threaded axial hole to receive and adjustably support the threaded stem of valve 21.

In the operation of the thermostatic valve, when the valve 21 is off its seat water flows past said seat, thence through the apertures in the shell flange 23a and over shell 23 to the discharge passage of the casing section 20. The cooled water extracts heat from the shell 23 which in turn cools and condenses the fluid between the shell and the diaphragm so that the latter expands, because of its own resilience and the pressure of the water which slowly leaks through the clearance between the shell member 23b and the valve carrier 26 and thus moves valve 21 to closed position on its seat. Thereafter as heat is absorbed by the thermostatic valve from the surrounding atmosphere the thermostatic vapor of the valve is again expanded so as to compress the diaphragm and open the valve 21 so as to re-establish the flow of cooled water. The movement of the valve toward and from its seat is rendered smooth and free from chatter by the dash-pot action of the water which can pass only slowly into and out from the chamber within the bellows diaphragm because of the small clearance between the parts 23b and 26. For an opening of approximately one quarter inch diameter in part 23b I have found a radial clearance of 0.002" to 0.005" satisfactory with a water pressure of 35 pounds per square inch.

By suitable adjustment of the valve 21 in its carrier 26 the valve can be made to close when the temperature of the various parts of the thermostatic valve structure falls to a predetermined value. However, the closing and opening of the thermostatic valve is dependent upon the pressure of the water as well as upon the temperature because the inner walls of the diaphragm structure of the valve are subjected to an unbalanced water pressure. The manual valve 17 can be used to throttle the flow of water and thus regulate to some extent the water pressure to which the thermostatic valve is subjected; but if the pressure of the water supply is unusually high it is ordinarily desirable to interpose an automatic pressure-reducing valve in the supply line. In connection with the adjustment of the thermostatic valve it will be observed that the temperature at which the valve closes for any particular adjustment of the valve tends to rise with increase in water pressure and to fall with decrease in water pressure.

As shown in the drawings, the discharge end of the thermostatic valve 18 is fitted with a coupling 27 to which in turn is connected a discharge pipe 28 leading to an open drain at a level below that of the thermostatic valve 18.

In the operation of the system, cold water drawn through the water line 14 extracts heat from the beer lines 6, 6 and keeps them at a suitable temperature, such temperature being regulated by the operation of the automatic thermostatic valve 18. In certain broader aspects of the invention the water line 14 may be connected with any suitable source of cold water but in carrying out the invention I prefer to draw the cold water from the cold water discharge pipe 12 of the beer cooler 7 and also to pass this water through cooling jackets of the specially constructed beer faucets 9, 9 to effect the cooling of these faucets. To this end the water pipe 12 is connected by pipe 29 to one of the faucets 9 and the latter faucet is connected to the second beer faucet by pipe 30 while the second faucet in turn is connected to the water line 14.

Figure 4:
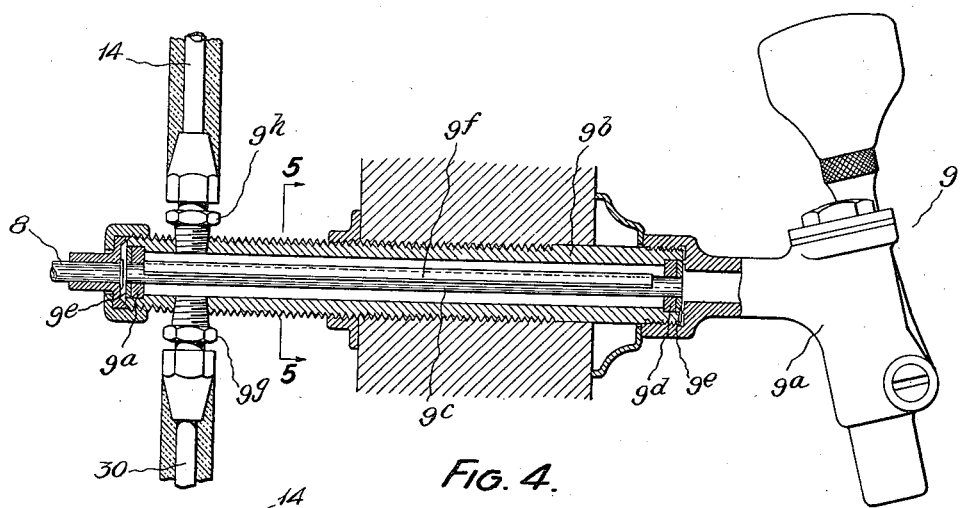
Fig. 4 is an enlarged view of one of the beer faucets of Fig. 1 showing the faucet partly in axial section and partly in side elevation.
Figure 5:
Fig. 5 is a section on the line 5—5 of Fig. 4.
Figure 3:
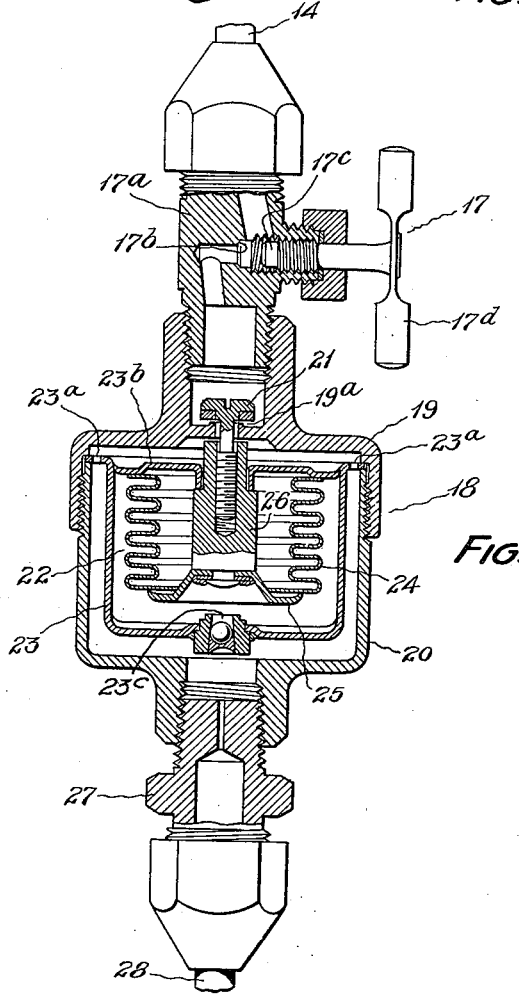
Fig. 3 is an enlarged axial sectional view of the valve device used to control the flow of cooling water for the beer line.

The water jacketed construction of the beer faucets 9, 9 is shown in Fig. 4 where 9a designates the body of the faucet proper which, as to valve mechanism, may be of any suitable construction. The faucet body 9a is screwed to the outlet end of a faucet shank 9b which extends through the wall of the bar structure. Within the shank 9b is arranged the beer tube 9c which is supported at each end of the shank by a metal ring 9d, these rings being joined respectively to the end portions of shank 9b and tube 9c by solder 9e so as to form a liquid-tight annular space between the shank and tube. This space is divided longitudinally into two chambers by a partition 9f which is formed as a strip of sheet metal bent on longitudinal lines as shown in Fig. 5. At its inlet end the faucet shank is provided with an inlet coupling 9g and an outlet coupling 9h. At the inlet end of the shank the partitition 9f extends to the ring 9d but at the front end of the shank it terminates short of the front ring 9d so that cooling water entering the coupling 9g passes along the beer tube 9c below partition 9f to the front end thereof and thence returns above the partition and tube to the discharge coupling 9h.

The beer pipes 8, 8 and the cold water pipes 12, 29 and 30 are preferably heat-insulated as indicated, as is also that section of the cold water pipe 14 extending from the upper beer faucet to the insulated beer lines 6, 6.

The operation of the cooling system will readily be understood in the light of the description already given. While the atmospheric temperatures to which the thermostatic valve 18 and the insulated beer lines 6, 6 are subjected may not be the same they tend to rise and fall together and by suitable adjustment of the valve member 21 of the thermostatic valve the latter can be made to open approximately when the temperature of the beer lines 6, 6 rises to a given point and to close approximately when the temperature of the beer lines falls to a given point.

In placing a newly installed system in operation, the manual water valve 17 is first adjusted to give a suitable maximum rate of water flow and then such adjustment of the thermostatic valve is made as is found necessary to keep the temperature of the beer lines within a desired temperature range during draft of beer. This initial adjustment of the thermostatic valve can be accomplished by inserting thermometers through the insulation of the beer lines 6, 6 and reading the temperatures from time to time during the draft of beer. When the adjustment has been accomplished in this manner the automatic operation of the thermostatic valve 18 will maintain the temperature of the beer lines within the predetermined range. So long as beer is being drawn through the lines 6, 6 neither said lines nor the beer faucets 9, 9 have an opportunity to warm up by absorption of heat from the surrounding air. If, under these conditions of continuous or frequent draft of beer the thermostatic valve 18 absorbs enough heat from its surrounding atmosphere it may open and start the flow of cooling water through line 14 but since the water in the insulated part of line 14 (which is nearly the entire line) is at a relatively low temperature valve 18 is quickly reduced in temperature by the flow of the cold water so that said valve is promptly closed. If, however, the draft of beer is interrupted for some considerable time so that the insulated part of the beer lines 6, 6 and water line 14 have opportunity to warm up, the thermostatic valve 18 when opened will remain open until the entire length of water line 14 is filled with cold water so that the water flowing to the valve is sufficiently low in temperature to cause it to close.

As has been stated in the preceding description, the cooling water may be drawn from any desired source of cold water, but the use of the water cooled by the beer cooler 7 is particularly advantageous since such cooler provides a water supply of which the temperature is relatively closely regulated so that when once the manual valve 17 and the thermostatic valve 18 have been properly adjusted, the automatic operation of the system maintains the temperature of the beer lines with relatively slight variation. Furthermore, the beer cooler 7 is in other respects especially well adapted to supply the water for cooling both the beer lines and the draft faucets without exceeding the capacity of the beer cooler. This follows from the fact that when there is a fairly steady draft of beer the beer lines 6, 6 do not have time to warm up and consequently during such periods there is little or no draft of cooling water through the line 14. It is only during intervals when beer is not being drawn that the draft faucets 9, 9 and the beer lines 6, 6 warm up and need the supply of cooling water, and at such times the load on the beer cooler 7 is nil so far as the beer coils are concerned. Again, when use is made of the improved water jacketed beer faucets the use of water cooled by the beer cooler for cooling these faucets as well as the beer lines obviously affords a simple and economic layout of piping, as well as effective cooling of both faucets and beer lines. From what has been said it is clear that my invention can be applied to the cooling of the beer lines either with or without the cooling of the faucets. And it should be understood also that the invention is applicable to the cooling of the faucets alone, as where the beer line between keg and cooler is short or can be effectively insulated. In these latter cases the cold water line leading from the faucet jackets may be shortened and extend directly to the thermostatic valve which, as before, will discharge to waste.

From the above description it will be seen that a beer dispensing system embodying the improved beer line cooling devices is adapted uniformly to maintain the beer in the kegs and in the lines up to the point of draft at sufficiently low temperatures both to insure a wholesome condition of the beer and substantially to prevent formation in the beer lines of free gas which would otherwise result from temperature variations with uncontrolled foaming at the point of draft.

In the present application the specific type of beer faucet construction illustrated is not claimed as it was not invented by the present applicant.

What I claim is:

1. In a cooling system for draft beverages, the combination of a cooled chamber for the beverage containers; a beverage container therein; a beverage dispensing faucet outside the cooled chamber; means for conducting beverage from the container to the faucet comprising a conduit extending from the container through the wall of the said chamber to the region of the faucet; a water conduit extending from the region of the faucet along the beverage conduit and in heat-conducting connection therewith to a point in the region of and outside the cooled chamber; a source of cold water connected to the inlet end of the water conduit; and a thermostatic valve outside the cooled chamber connected to control flow of water through the water conduit to a point of discharge, said valve opening when its temperature rises and closing when it falls, whereby cold water is maintained in the water conduit without wastage of water and the beverage conduit is maintained at a suitably low temperature.

2. A cooling system as claimed in claim 1 in which the parts of the beverage and water conduits in heat-conducting connection are heat-insulated from the surrounding air.

3. A cooling system as claimed in claim 1 in which the water conduit is provided with a manual flow-controlling valve in series with the thermostatic valve.

4. In a cooling system for draft beverages, the combination of a cooled chamber for the beverage containers; a beverage container therein; a beverage dispensing faucet outside the cooled chamber; a beverage cooler adjacent the faucet and having its beverage discharge connected to the faucet; a beverage conduit extending from the container through the wall of the said chamber to the cooler; a water conduit extending from the region of the cooler along the beverage conduit and in heat-conducting connection therewith to a point in the region of and outside the cooled chamber; a source of cold water connected to the inlet end of the water conduit; and a thermostatic valve outside the cooled chamber connected to control flow of water through the water conduit to a point of discharge, said valve opening when its temperature rises and closing when it falls, whereby cold water is maintained in the water conduit without wastage of water and the beverage conduit is maintained at a suitably low temperature.

5. In a cooling system for draft beverages, the combination of a cooled chamber for the beverage container; a beverage container therein; a beverage dispensing faucet outside the cooled chamber; a cooler adjacent the faucet for cooling water and the beverage on draft, the beverage discharge of the cooler being connected to the said faucet; a beverage conduit extending from the container through the wall of the said chamber to the beverage inlet of the said cooler; a water conduit extending from the water outlet of the said cooler along the beverage conduit and in heat-conducting connection therewith to a point in the region of and outside the cooled chamber; and a thermostatic valve outside the cooled chamber connected to control flow of water through the water conduit to a point of discharge, said valve opening when its temperature rises and closing when it falls, whereby cold water is maintained in the water conduit without wastage of water and the beverage conduit is maintained at a suitably low temperature.

6. In a cooling system for draft beverages, the combination of a cooled chamber for the beverage container; a beverage container therein; a beverage dispensing faucet outside the cooled chamber, said faucet having a water jacket with inlet and outlet passages for cooling water; means for conducting beverage from the container to the faucet comprising a conduit extending from the container through the wall of the said chamber to the region of the faucet; a water conduit extending from the region of the faucet along the beverage conduit and in heat-contacting connection therewith to a point in the region of and outside the cooled chamber; a source of cold water; water-conducting means extending from the said source to the water jacket of the beverage faucet and thence from said water jacket to the inlet of the said water conduit; and a thermostatic valve outside the cooled chamber connected to control flow of water through the water conduit to a point of discharge, said valve opening when its temperature rises and closing when it falls, whereby cold water is maintained in the water jacket of the faucet and in the water conduit without wastage of water and said water jacket and beverage conduit are maintained at suitably low temperatures.

7. In a cooling system for draft beverages, the combination of a cooled chamber for the beverage container; a beverage container therein; a beverage dispensing faucet outside the cooled chamber, said faucet having a water jacket with inlet and outlet passages for cooling water; a cooler adjacent the faucet for cooling water and the beverage on draft, the beverage outlet of the cooler being connected to said faucet; a beverage conduit extending from the container through the wall of the said chamber to the said cooler; a water conduit extending from the region of the faucet along the beverage conduit and in heat-conducting connection therewith to a point in the region of and outside the cooler chamber; water conducting means extending from the water outlet of the said cooler to the water jacket of the beverage faucet and thence from said water jacket to the inlet of the said water conduit; and a thermostatic valve outside the cooled chamber connected to control flow of water through the said water conduit to a point of discharge, said valve opening when its temperature rises and closing when it falls, whereby cold water is maintained in the water jacket of the faucet and in the water conduit without wastage of water and the faucet and beverage conduit are maintained at suitably low temperatures.

8. In a cooling system for draft beverages, the combination of a liquid cooler for receiving and cooling a draft beverage and for also receiving and cooling water; a beverage draft faucet arranged near said cooler and having a cold water jacket with inlet and outlet for the circulation of cooling water through the jacket; conduit means connecting the faucet to the beverage discharge of the cooler; conduit means connecting the inlet of the said jacket to the water discharge of the cooler; a conduit connected to the jacket outlet to condut water therefrom to a point of waste; and a thermostatic valve associated with the latter conduit to control the flow of water therethrough.

HOWARD B. McLAUGHLIN.